United States Patent [19]
Hori

[11] Patent Number: 4,942,781
[45] Date of Patent: Jul. 24, 1990

[54] DIFFERENTIAL PLANEL GEAR UNIT

[75] Inventor: Kouhei Hori, Chigasaki, Japan

[73] Assignee: Kabushiki Kaisha Toshiba, Kawasaki, Japan

[21] Appl. No.: 294,019

[22] Filed: Jan. 6, 1989

[30] Foreign Application Priority Data

Jan. 6, 1988 [JP] Japan .................. 63-000404

[51] Int. Cl.$^5$ .................. F16H 1/32; F16H 55/08
[52] U.S. Cl. .................. 475/342; 74/462; 475/344
[58] Field of Search .................. 74/801, 462

[56] References Cited

U.S. PATENT DOCUMENTS

| | | | |
|---|---|---|---|
| 2,682,760 | 7/1954 | Shenk | 74/462 X |
| 3,116,651 | 1/1964 | Hardy | 74/801 |
| 3,329,037 | 7/1967 | Stott | 74/462 X |
| 3,596,538 | 8/1971 | Braun | 74/801 |
| 3,792,629 | 2/1974 | Applebury | 74/801 |
| 4,043,226 | 8/1977 | Buuck | 74/801 |
| 4,280,376 | 7/1981 | Rosen | 74/801 X |
| 4,366,727 | 1/1983 | Jonsson | 74/801 |
| 4,593,679 | 6/1986 | Collins | 74/462 X |
| 4,679,459 | 7/1987 | F'Geppert | 74/462 X |

FOREIGN PATENT DOCUMENTS

| | | | |
|---|---|---|---|
| 0274089 | 7/1988 | European Pat. Off. | 74/801 |
| 821302 | 11/1951 | Fed. Rep. of Germany | 74/801 |
| 2598766 | 11/1987 | France | 74/801 |

OTHER PUBLICATIONS

Masataka Senba, Gear, vol. 10, Nikkan Kogyo, Nov. 1967, pp. 3989–3992.
Muneharu Morozumi, Design of Planetary Gears and Differential Planetary Gears, Sankei, Jun. 1, 1984, pp. 124–127.

*Primary Examiner*—Dwight Diehl
*Attorney, Agent, or Firm*—Foley & Lardner, Schwartz, Jeffery, Schwaab, Mack, Blumenthal & Evans

[57] ABSTRACT

The present invention discloses a differential planet gear unit, in which a sun gear is engaged with first and second ring gears coaxially aligned through planet gears interposed therebetween, and the tooth number of the first ring gear is different from the tooth number of the second ring gear, in which the first and second ring gears engage with first and second portions of each planet gear, and the diameters of the addendum circles of the teeth of the first ring gear and the first tooth portion of each planet gear are different from those of the second ring gear and the second tooth portion of each planet gear, respectively, to reduce a difference between an approaching contact length and a receding contact length along a contact action line. The first ring gear and the second tooth portion of each planet gear may be formed with first and second chamfers, respectively, in both sides of the addendum of the teeth to reduce the difference between the approaching and receding contact lengths.

5 Claims, 6 Drawing Sheets

$e$ : TOTAL RATIO OF CONTACT
$e_1$ : APPROACHING RATIO OF CONTACT
$e_2$ : RECEDING RATIO OF CONTACT

| CONTACT | BEFORE CORRECTION | AFTER CORRECTION |
|---------|-------------------|------------------|
| P – Q   | ○                 | ●                |
| P – R   | △                 | ▲                |

$e_1/e_2$ OR $e_2/e_1$

1

DIFFERENTIAL PLANET GEAR UNIT

BACKGROUND OF THE INVENTION

1. Field of the Invention

The present invention relates to a differential planet gear unit for use in reduction gears constituting link driving mechanisms for industrial robots.

2. Description of the Background Art

In multi-link type robots in general, a construction with actuators for each link drive dispersively arranged is employed and each of these robots is provided with reduction gears for reducing the rotational speed of each actuator. In this kind of reduction gear system, a large reduction gear ratio as well as small in size and light in weight is required. In addition, reduction gears having a high torque and power transmission with a high torsion rigidity are also required.

Figure 1:
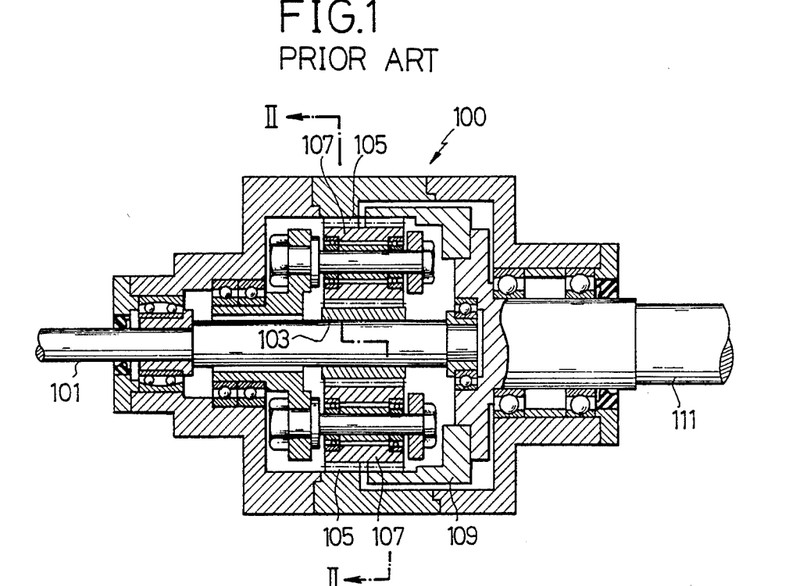
FIG. 1 is a longitudinal cross section of a conventional differential planet gear unit.
Figure 2:
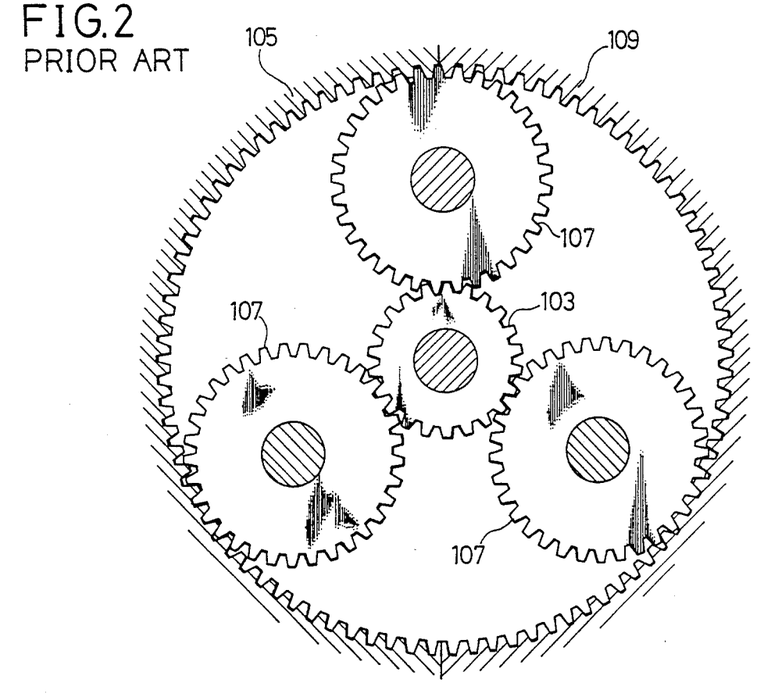
FIG. 2 is a cross section of the differential planet gear unit shown in FIG. 1.

Under these circumstances, a conventional differential planet gear unit 100, as shown in FIGS. 1 and 2, has been used as a reduction gear. In the differential planet gear unit 100, a sun gear 103 is rotated by the rotation of an input shaft 101, and the rotation of the sun gear 103 is transmitted to three planet gears 107 arranged at an equal angular distance so as to engage with both the sun gear 103 and a fixed ring gear 105.

The planet gears 107 rotate around their own axes while they also revolve around the sun gear 103. Each of the planet gears 107 is engaged with the fixed ring gear 105 as well as with a rotary ring gear 109 having a slight difference in the number of teeth relative to that of the fixed ring gear 105, thereby rotating an output shaft 111 through the rotary ring gear 109 secured thereto.

As a result, when each of the planet gears 107 is rotated around its own axis while it is also revolved around the sun gear 103, the rotary ring gear 109 is rotated in accordance with the difference in the number of teeth between the rotary ring gear 109 and the fixed ring gear 105, thereby decreasing the rotational speed of the output shaft 111 against that of the input shaft 101.

Figure 3:
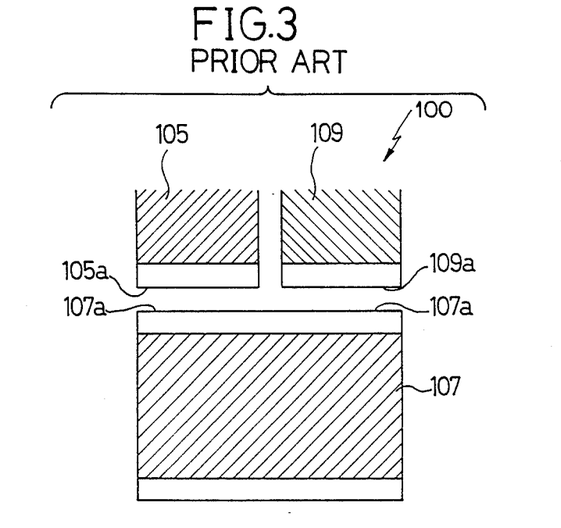
FIG. 3 is a schematic cross section of the main portion of the gear unit shown in FIGS. 1 and 2.

Now, in the differential planet gear unit 100, in order to precisely engage each planet gear 107 with the fixed ring gear 105 and the rotary ring gear 109 which are coaxially arranged and have the difference in the number of their teeth, as shown in FIG. 3, the addendum modification coefficient of one ring gear having the lesser number of teeth, for instance, the fixed ring gear 105, is formed larger in its design. As a result, the diameter of the addendum circle 105a of the fixed ring gear 105 is almost equal to that of the addendum circle 109a of the rotary ring gear 109.

Furthermore, the planet gears 107 engaging with both the ring gears 105 and 109 are integrally formed and have a common formation so that the diameter of the addendum circle 107a of the planet gear 107, which contacts with both the fixed and rotary ring gears 105 and 109, is equal to those of the latter.

In such a differential planet gear unit 100 described above, a large reduction gear ratio can be obtained due to the differential action in accordance with the difference between the tooth numbers of the two ring gears 105 and 109. In addition, since the planet gears 107 engaging with both the fixed and rotary ring gears 105 and 109 are integrally formed and have the common formation, as described above, deformation of the planet gears is reduced, and, since the output from the rotary ring gear is directly picked up, the torsion rigidity is improved. As a result, the differential planet gear unit thus integrally formed becomes small in size and light in weight due to the reduction in the number of parts to be used.

On the other hand, the following problems arise in the conventional differential planet gear unit 100. In the other reduction gears for robots of late years, the power transmission efficiency often exceeds more than 80%, whereas in the reduction gear system of this kind having a tooth number difference of three between the fixed and rotary ring gears in the gear unit 100 described above, its power transmission efficiency is approximately 70% to 75%.

Consequently, since the power transmission efficiency remains low although the reduction gears are diminished and are formed in light weight, there is a problem that large size motors are needed in order to compensate for the power loss thereof. The cause of this reduced efficiency in the differential planet gear unit 100 has long been unsolved.

The inventor of this application has found the reason or cause of the low power transmission efficiency after conducting various experiments for the differential planet gear unit.

The efficiency of the differential planet gear unit 100 can be sought from the ratio of contact of the gears in the unit 100. Particularly, each of the ratios of contact between the fixed ring gear 105 and the planet gear 107 and between the rotary ring gear 109 and the planet gear 107 greatly effects the power transmission efficiency.

Figure 4A:
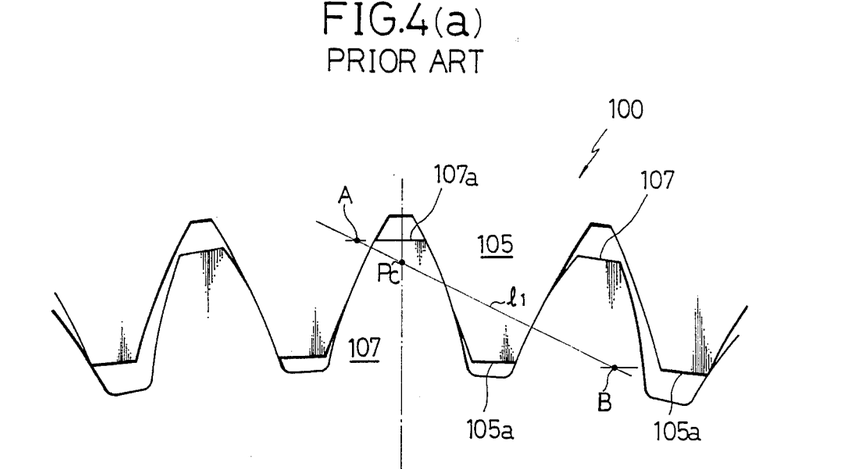
FIG. 4(a) illustrates an engaged condition on a contact action line between a fixed and rotary ring gears of a differential planet gear unit shown in FIGS. 1 to 3.

FIG. 4(a) shows the involute tooth forms of the fixed ring gear 105 and the planet gear 107 and a contact action line $l_1$ thereof in the gear unit 100. Since the addendum modification coefficient of the fixed ring gear 105 is very large as compared with that of the planet gear 107, a contact pitch point Pc leans largely toward the addendum from the center of the tooth height of the planet gear 107. As a result, it is to be appreciated that an approaching contact length $e_1$, i.e., a straight line segment A - pc between a contact start point A and the contact pitch point Pc is short while a receding contact length $e_2$, i.e., a straight line: segment Pc - B between the contact pitch point Pc and a contact end point B is much longer.

Figure 4B:
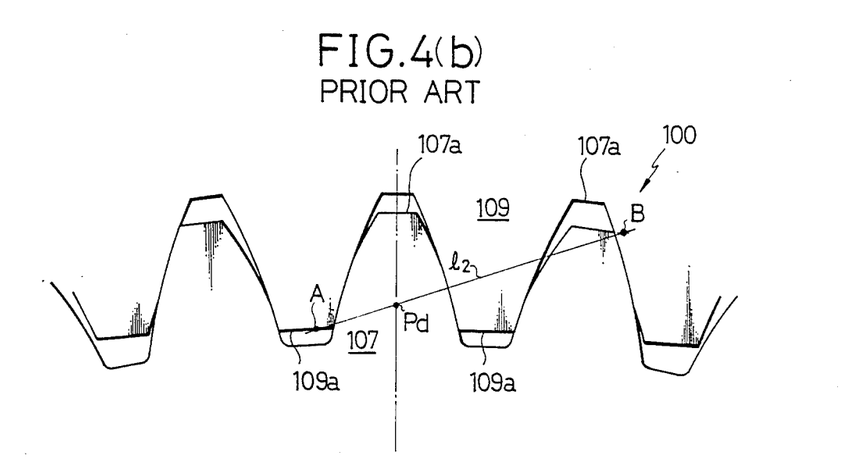
FIG. 4(b) illustrates an engaged condition on a contact action line between the rotary ring gear and planet gears of the differential planet gear unit in the same manner as FIG. 4(a)

Similarly, FIG. 4(b) shows the involute tooth forms of the rotary ring gear 109 and the planet gear 107 and a contact action line $l_2$ thereof. In this contact, a contact pitch point Pd leans largely toward the addendum from the center of the tooth height of the planet gear 107. Consequently, it is appreciated that the approaching contact length $e_1$, i.e., A - pd is short whereas the receding contact length $e_2$, i.e., Pd - B is much longer.

As is well-known, in involute gears having a general involute tooth form, when the teeth are engaged with each other at the contact pitch point, their efficiency become high as a result of 100% rolling. However, when the teeth are engaged with each other at a point off from the pitch point, the sliding velocity increases in proportion to the offset distance from the pitch point while reducing its efficiency. In the engagement of profile shifted gears, on the other hand, since the contact pitch point is largely offset from the center of the tooth height of the gears, either the approaching contact length or the receding contact length will become extremely long, thereby increasing the sliding velocity while decreasing the efficiency of the gear unit.

This causes the reduction of the power transmission efficiency in the conventional differential planet gear unit.

SUMMARY OF THE INVENTION

It is therefore an object of the present invention to provide a differential planet gear unit, free from the aforementioned defects and drawbacks of the prior art, which is capable of improving power transmission efficiency without lowering its innate merit such as small size, light weight and a high rigidity.

It is another object of the present invention to provide a differential planet gear unit which is capable of reducing a difference between an approaching contact length and a receding contact length along a contact action line of each planet gear and one of fixed and rotary ring gears by correcting diameters of addendum circles of the gears.

In accordance with one aspect of the present invention, there is provided a differential planet gear unit, comprising a sun gear, planet gears engaged with the sun gear, a first ring gear having a first number of teeth, and a second ring gear having a second number of teeth, the first tooth number being different from the second tooth number, the first and second ring gears coaxially aligning and simultaneously engaging with first and second tooth portions of each planet gear, respectively, diameters of addendum circles of the teeth of the first ring gear and the first tooth portion of each planet gear being different from those of the second ring gear and the second tooth portion of each planet gear, respectively, to reduce a difference between an approaching contact length and a receding contact length along a contact action line of each of the planet gears and one of the first and second ring gears.

In accordance with another aspect of the present invention, there is provided a differential planet gear unit, comprising a sun gear, planet gears engaged with the sun gear, a first ring gear having a first number of teeth, and a second ring gear having a second number of teeth, the first tooth number being different from the second tooth number, the first and second ring gears coaxially aligning and simultaneously engaging with first and second tooth portions of each planet gear, respectively, the first ring gear being formed with first chamfers in both sides of the addendum of the teeth and the second tooth portion of each planet gear being formed with second chamfers in both sides of the addendum of the teeth to reduce a difference between an approaching contact length and a receding contact length along a contact action line of each of the planet gears and one of the first and second ring gears.

BRIEF DESCRIPTION OF THE DRAWINGS

These and other objects, features, and advantages of the present invention will be apparent from the following description of the invention with reference to the accompanying drawings, in which.

DESCRIPTION OF THE PREFERRED EMBODIMENTS

Figure 5:
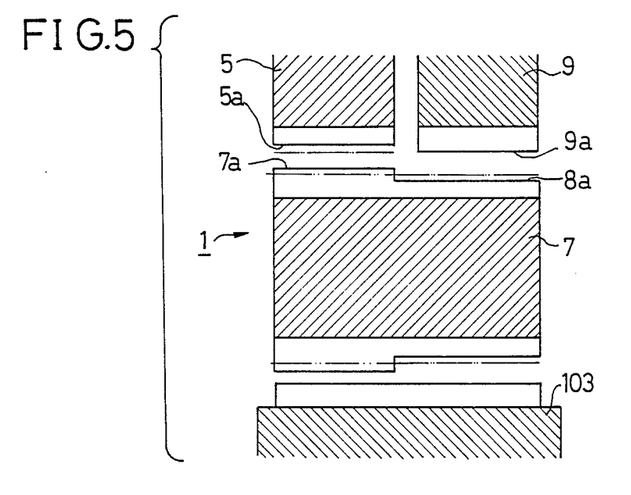
FIG. 5 is a schematic cross section of a main portion of one embodiment of the differential planet gear unit according to the present invention.

Referring now to the drawings, there is schematically shown in FIG. 5 a main portion of a differential planet gear unit according to the present invention, having basically the same construction as that of the conventional differential planet gear unit shown in FIGS. 1 to 4, except tooth forms of gears, and thus the description of the same portions as those of the conventional differential planet gear unit may be omitted for the brevity.

In FIG. 5, there are shown a fixed ring gear 5, a rotary ring gear 9 and one of planet gears 7 to be engaged therewith, and the diameters of the addendum circles of the fixed ring gear 5 and the planet gear 7 are improved, as shown in FIG. 5. The differential planet gear unit 1 comprises a sun gear 103 at its center, two ring gears consisting of a fixed ring gear 5 and a rotary ring gear 9 which have the difference in the number of teeth, respectively, engaged with the sun gear 103 coaxially, and planet gears 7 provided around the sun gear 103 so as to engage with both the fixed ring gear 5 and the rotary ring gear 9 as well as the sun gear 103. Usually, the ratios of contact of the ring gears is large, but approximately 1.2 to 1.4 may be sufficient as the ratio of contact in this embodiment.

A common formation of these gears 5, 7, 9, and 103 is as follows. They are formed as involute tooth spur gears using a tool of a full depth tooth having a module $m=1.25$ and a pressure angle $\alpha c=20°$. The tooth numbers of the sun gear 103, the fixed ring gear 5, the rotary ring gear 9, and the planet gear 7 are determined to 12, 105, 108 and 47, respectively. Accordingly, the reduction gear ratio becomes 351.

Supposing that the addendum modification coefficients of the fixed ring gear 5, the rotary ring gear 9 and the planet gear 7 are determined to 1.64, 0, and 0.324, respectively, the distance between the centers of the planet gear 7 and the fixed ring gear 5 or the rotary ring gear 9 is equal to 37.702 mm.

In the conventional gear unit shown in FIGS. 4(a) and 4(b), the diameters of the addendum circles of the fixed ring gear 105 and the rotary gear 109 are calculated from the tooth formation to obtain 132.426 mm and 132.463 mm, respectively. These two values are almost equal when taking into account the normal work precision.

However, according to the present invention, in general, diameters of addendum circles of fixed and rotary ring gears are improved so that the diameter of the addendum circle of one having a smaller tooth number may be enlarged while the diameter of the addendum circle of the other having a larger tooth number may be diminished. In this embodiment, in practice, the diameters of the addendum circles of both the fixed ring gear 5 and the rotary ring gear 9 are so formed that the diameter of the addendum circle 9a of the rotary ring gear 9 having the larger number of teeth is 132.48 mm which is substantially the same value as that of the conventional one, while the diameter of the addendum circle 5a of the fixed ring gear 5 having the less number of teeth is 133.63 mm which is larger than that of the conventional one. Namely, the former is larger than the latter in diameter. The enlarging and diminishing of the diameters of the addendum circles of the fixed and rotary ring gears may be properly modified in practice, as the occasion demands.

TABLE 1

| Gears | S | P | Q | R |
|---|---|---|---|---|
| Tooth number | 12 | 47 | 105 | 108 |
| Tool | Full Depth Tooth, m = 1.25, αc = 20° | | | |
| Addendum Circle (mm) | 18.10 | 62.40/ 60.34 | 132.48 | 132.48 |
| Dedendum Circle (mm) | 12.38 | 56.435 | 138.475 | 138.125 |
| Center Distance | $a_{(SP)} = a_{(PQ)} = a_{(PR)} = 37.702$ mm | | | |
| Rate of Contact | $e_{(SP)} = 1.45, e_{(PQ)} = 1.35, e_{(PR)} = 1.31$ | | | |

S: Sun gear;
P: Planet gear;
Q: Fixed ring gear; and
R: Rotary ring gear.

Moreover, the diameter of the addendum circle of the planet gear 107 in the conventional gear unit is 61.9 mm, whereas in the present invention the diameter of the addendum circle 7a of the planet gear 7 engaging with the fixed ring gear 5 is enlarged to 62.40 mm while the diameter of the addendum circle 8a of the planet gear 7 engaging with the rotary ring gear 9 is reduced to 60.34 mm. Namely, the latter is formed smaller than the former in diameter. In this embodiment, the addendum circle of the fixed ring gear 5 is formed larger and one of the addendum circle 8a of the planet gear 7 is formed larger, while the other 7a thereof is formed smaller in its construction. One embodiment of the formation of the gears of the differential planet gear unit of the present invention is tabulated in Table 1.

Figure 6A:
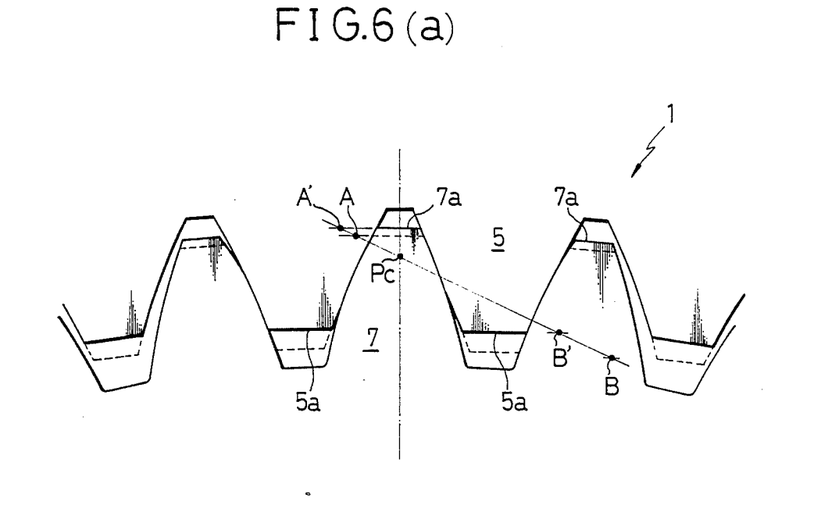
FIG. 6(a) illustrates an engaged condition on a contact action line between a fixed ring gear and a planet gear of one of embodiment of the differential planet gear unit according to the present invention.
Figure 6B:
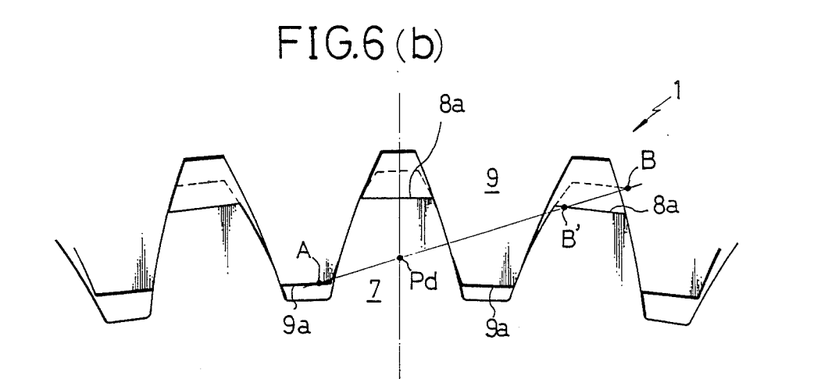
FIG. 6(b) illustrates an engaged condition on a contact action line between a rotary ring gear and the planet gear of the differential planet gear unit of FIG. 6(a) in the same manner as FIG. 6(a)

In FIGS. 6(a) and 6(b), there is shown a first embodiment of the present invention, and FIGS. 6(a) and (b) show respectively the contact lengths in the diameters of the addendum circles of the planet gear 7 and the fixed or rotary ring gear 5 or 9 of the differential planet gear unit according to the present invention.

In the engagement or contact of the fixed ring gear 5 with the planet gear 7, as shown in FIG. 6(a), the addendum circle 5a of the fixed ring gear 5 is formed much larger than that of the conventional one shown in FIG. 4a by somewhat enlarging the addendum circle 7a of the planet gear 7 in order to ensure the necessary ratio of contact. As a result, a contact start point A' is much farther from the contact pitch point Pc than the conventional contact start point A, and a contact end point B' is much closer toward the contact pitch point Pc than the conventional contact end point B. In other words, the contact section B-B' where the sliding velocity is increased due to the offset from the pitch Pc can be removed in this embodiment, thereby improving the contact efficiency.

Similarly, in the engagement of the rotary ring gear 9 with the planet gear 7 shown in FIG. 6(b), since the addendum circle 8a of the planet gear 7 is formed smaller compared with the conventional one, the end point B' of the contact is much closer toward the pitch point Pd than the conventional end point B. That is, the contact section B-B' where the sliding velocity is increased due to the offset from the pitch point Pd can be removed in this embodiment, thereby improving the contact efficiency.

Figure 7A:
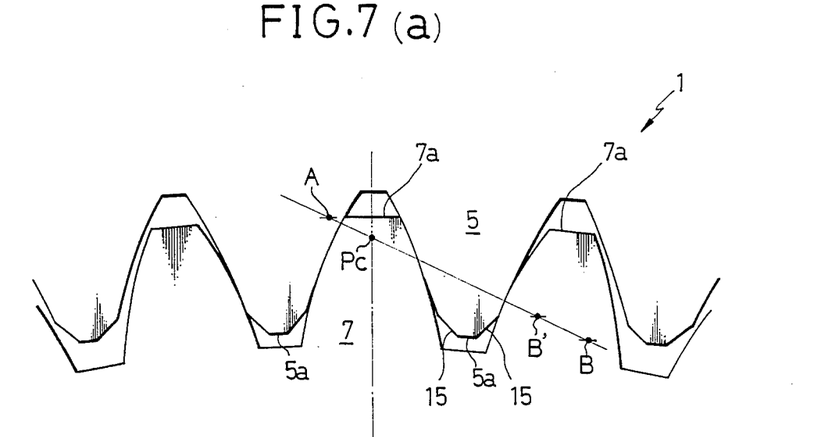
FIG. 7(a) illustrates an engaged condition on a contact action line between a fixed ring gear and a planet gear of another embodiment of the gear unit according to the present invention.
Figure 7B:
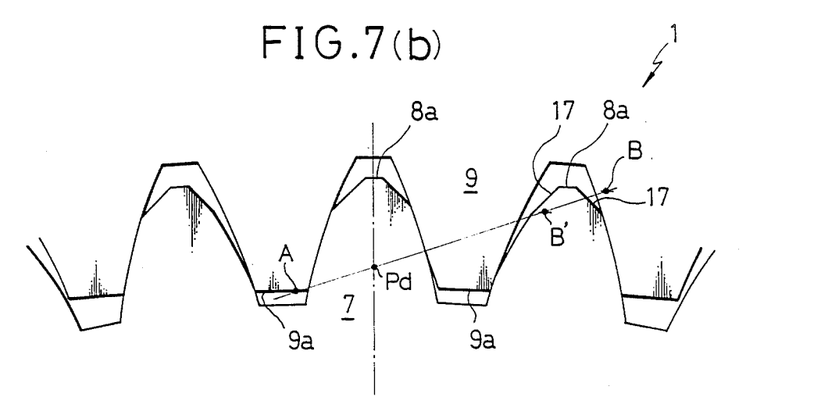
FIG. 7(b) illustrates an engaged condition on a contact action line between a rotary ring gear and the planet gear of the planet gear unit of FIG. 7(a) in the same manner as FIG. 7(a)

In FIGS. 7(a) and 7(b) there is shown a second embodiment of the present invention, and FIG. 7(a) and (b) show respectively the contact lengths in the diameters of the addendum circles of planet gear 7 and the fixed or rotary ring gear 5 or 9 of the differential planet gear unit according to the present invention, in which the sides of the addendum of the teeth of the fixed ring gear 5 and the engaged portion 8a of the planet gear 7 are chamfered, resulting in the same effect and advantages as those in the first embodiment described above.

In FIG. 7(a), the fixed ring gear 5 having the same diameter of the addendum circle 5a as that of the conventional one is formed with chamfers 15 in its both sides of the addendum of the teeth of the gear by chamfering. Similarly in FIG. 7(b), in the planet gear 7, chamfers 17 are provided in both sides of the addendum of the teeth of engaged portion 8a engaging with the rotary ring gear 9. In this embodiment, the contact end point B' is much closer to the pitch point Pc or Pd than the conventional end point B, thereby improving the contact efficiency in the similar manner to the first embodiment.

Figure 8:
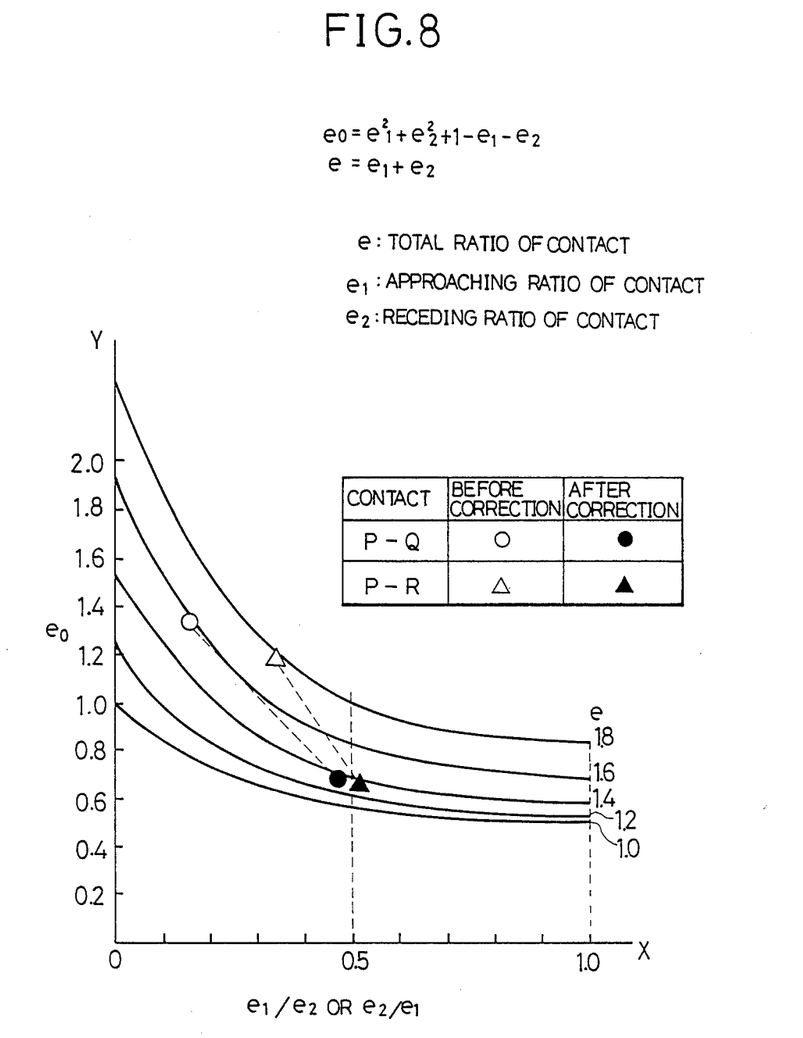
FIG. 8 a graphical representation of characteristic curves of improved ratios of the contact pants of gears of the differential planet gear unit according to the present invention.

FIG. 8 shows the characteristic curves of the improved ratios of contact in the foregoing embodiments according to the present invention. In the characteristic curves, the X-axis indicates the ratio $e_1/e_2$ or $e_2/e_1$ between the approaching ratio of contact $e_1$ and the receding ratio of contact $e_2$, while the Y-axis indicates the ratio of contact $e_0$. Each ratio of contact is calculated by the following equations:

$$e_0 = e_1^2 + e_2^2 + 1 - e_1 - e_2$$

$$e = e_1 + e_2$$

where
  e = total ratio of contact,
  $e_1$ = approaching ratio of contact, and
  $e_2$ = receding ratio of contact.

The engagement or contact of each gear is expressed by p−Q and p−R, where p indicates the planet gear 7, Q indicates the fixed ring gear 5, and R indicates the rotary ring gear 9.

In the characteristic curves, the ones indicated by the solid lines show the relationship between $e_0$ and $e_1/e_2$ or between $e_0$ and $e_2/e_1$, when the total ratio of contact e is varied from 1.0 to 1.8.

As is well-known, since the efficiency $\eta i$ is expressed in the following equation:

$$\eta_i = 1 - \mu.\pi(1/Z_2 - 1/Z_1)e_0$$

where $\mu$ is an average abrasion coefficient of contact,
$Z_1$ = the number of teeth of an outernal gear, and
$Z_2$ = the number of teeth of an ring gear.

When the ratio of contact $e_0$ is lowered, the power transmission efficiency is improved. In this embodiment, the total ratio of contact is aimed at about $e = 1.3$, and the range of curves is restricted between $e = 1.2$ and $e = 1.4$.

As will be appreciated from the characteristic curves, the ratio of contact $e_0$ can strikingly be lowered by the stepping difference after correction, thereby improving the power transmission efficiency largely.

The power transmission efficiency of the differential planet gear unit according to the present invention can be improved up to 80 to 85% by the above improvement in the ratio of contract in each gear, which will largely affect the power transmission efficiency of the gear unit, compared with the conventional one. Yet, a high efficiency can be realized without lowering the merit of the differential planet gear unit of this kind, such as small in size, light in weight, high reduction in speed, and high rigidity. In addition, the contact noise generated by the gear engagement can be reduced in the gear unit according to the present invention.

The present invention is not limited to the embodiments described above. The difference in the number of teeth of the fixed and rotary ring gears may be different from the ones described in the foregoing embodiments. In that case, the effects of the differential planet gear unit are not changed even when the number of teeth of the fixed ring gear is much larger than that of the rotary ring gear.

Moreover, a tooth formation of the gears is also not limited to the sizes described in the embodiments according to the present invention. Specifically, the diameter of the addendum circle of each gear is not limited to the sizes described in the foregoing embodiments only when the relationship of the sizes of the gears is maintained at the gist of the invention. Similarly, the present invention can be applied to other differential planet gear units without the sun gear, or having a different number of the planet gears.

Although the differential planet gear unit has been applied to reduction gears in the foregoing embodiments, it is also possible that the same can be applied to speed-up gears with the input and output shafts being reversed.

While the invention has been described in its preferred embodiments, it is to be understood that the words which have been used are words of description rather than limitation and that various changes and modifications may be made within the purview of the appended claims without departing from the scope and spirit of the invention in its broader aspects.

What is claimed is:

1. A differential planet gear unit, comprising:
a sun gear;
planet gears engaged with the sun gear;
a first ring gear having a first number of teeth; and
a second ring gear having a second number of teeth, the first tooth number being different from the second tooth number, the first and second ring gears coaxially aligning and simultaneously engaging with first and second tooth portions of each planet gear, respectively, diameters of addendum circles of the teeth of the first ring gear and the first tooth portion of each planet gear being different from those of the second ring gear and the second tooth portion of each planet gear, respectively, to reduce a difference between an approaching contact length and a receding contact length along a contact action line of each of the planet gears and one of the first and second ring gears.

2. The gear unit of claim 1, wherein the diameters of the addendum circles of the teeth of the first ring gear and the first tooth portion of each planet gear are larger than those of the second ring gear and the second tooth portion of each planet gear, respectively, and the first tooth number of the first ring gear is smaller than the second tooth number of the second ring gear.

3. The gear unit of claim 2, wherein the first ring gear is a fixed ring gear and the second ring gear is a rotary ring gear.

4. A differential planet gear unit comprising:
a sun gear;
planet gears engaged with the sun gear;
a first ring gear having a first number of teeth; and
a second ring gear having a second number of teeth, the first tooth number being different from the second tooth number, the first and second ring gears coaxially aligning and simultaneously engaging with first and second tooth portions of each planet gear, respectively, the first ring gear being formed with first chamfers in both sides of addendum of the teeth and the second tooth portion of each planet gear being formed with second chamfers in both sides of the addendum of the teeth to reduce a difference between an approaching contact length and a receding contact length along a contact action line of each of the planet gear and one of the first and second ring gears.

5. The gear unit of claim 4, wherein the first ring gears is a fixed ring gear and the second ring gear is a rotary ring gear.

* * * * *